United States Patent
Tokunaga et al.

(10) Patent No.: US 11,533,684 B2
(45) Date of Patent: Dec. 20, 2022

(54) RELAY DEVICE

(71) Applicant: DENSO CORPORATION, Kariya (JP)

(72) Inventors: Tomoya Tokunaga, Kariya (JP);
Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/396,808

(22) Filed: Aug. 9, 2021

(65) Prior Publication Data
US 2022/0070774 A1 Mar. 3, 2022

(30) Foreign Application Priority Data

Aug. 27, 2020 (JP) .............................. JP2020-143560

(51) Int. Cl.
*H04W 52/02* (2009.01)
*H04L 12/40* (2006.01)

(52) U.S. Cl.
CPC ... *H04W 52/0229* (2013.01); *H04L 12/40039* (2013.01); *H04L 12/40078* (2013.01); *H04W 52/0274* (2013.01)

(58) Field of Classification Search
CPC .......... H04W 52/0229; H04W 52/0274; Y02D 30/70; H04L 2012/40273; H04L 12/40039; H04L 12/12
See application file for complete search history.

(56) References Cited

U.S. PATENT DOCUMENTS

| | | | |
|---|---|---|---|
| 10,754,411 B2* | 8/2020 | Kim ........................ | H04L 12/40 |
| 2005/0204204 A1 | 9/2005 | Muth | |
| 2012/0221753 A1* | 8/2012 | Hartwich ........... | H04L 12/40039 710/107 |
| 2013/0318380 A1* | 11/2013 | Behrens ............. | H04L 12/40039 713/323 |
| 2014/0350772 A1* | 11/2014 | Saito ..................... | G07C 5/0808 701/29.1 |
| 2015/0192983 A1* | 7/2015 | Rennig ................. | G06F 1/3243 713/323 |

FOREIGN PATENT DOCUMENTS

| | | |
|---|---|---|
| JP | 2005-529517 A | 9/2005 |
| JP | 2012-49884 A | 3/2012 |

OTHER PUBLICATIONS

Shreejith et al, "Extensible FlexRay Communication Controller for FPGA-Based Automotive Systems", IEEE, 2015 (Year: 2015).*
Herpel et al, "A Simulation Approach for the Design of Safety-Relevant Automotive Multi-ECU Systems", IEEE, 2008 (Year: 2008).*

* cited by examiner

*Primary Examiner* — Omer S Mian
(74) *Attorney, Agent, or Firm* — Harness, Dickey & Pierce, P.L.C.

(57) ABSTRACT

A relay device in a communication system receives a plurality of wakeup frames from one or more than one communication device connected to each bus of a plurality of buses via a corresponding port. The relay device obtains an aggregated wakeup pattern by aggregating information on an operating mode of each communication device included in the plurality of wakeup frames so as to include predetermined information to be transmitted and received and reduce the number of wakeup patterns. By using the aggregated wakeup pattern obtained by aggregating the information on the operating mode, a wakeup frame for transmission to each bus via the corresponding port is prepared.

11 Claims, 8 Drawing Sheets

1st GW COMMUNICATOR UNIT

|  | WAKEUP PATTERN | |
|---|---|---|
| WU PATTERN OF 1st WUF | 1000 | 1000 |
| WU PATTERN OF 2nd WUF | 1000 | 0001 |
| WU PATTERN OF 3rd WUF | 1110 | 1001 |
| WU PATTERN FOR PORT | 1110 | 1001 |

|  | WAKEUP PATTERN |
|---|---|
| WU PATTERN FOR PORT OF 2nd GW COMM (RECEIVE) | 0010 0100 |
| WU PATTERN FOR PORT OF 3rd GW COMM (RECEIVE) | 0010 0000 |
| WU PATTERN FOR PORT OF 4th GW COMM (RECEIVE) | 0000 1000 |
| WU PATTERN FOR TRANSMIT OF 1st GW COMM (TRANSMIT) | 0010 1100 |

RELAY DEVICE

CROSS REFERENCE TO RELATED APPLICATION

The present application claims the benefit of priority from Japanese Patent Application No. 2020-143560 filed on Aug. 27, 2020. The entire disclosure of the above application is incorporated herein by reference.

TECHNICAL FIELD

The present disclosure relates to a technique for communicating by connecting a plurality of networks so as to be able to communicate with each other.

BACKGROUND

The CSMA/CD CAN protocol is known as a communication protocol that is often used in vehicle communication systems. CAN is an abbreviation for Controller Area Network and is a registered trademark. Further, there is also known a communication system in which a plurality of communication paths (hereinafter, buses) are connected by a relay device (hereinafter, gateway device).

Furthermore, there is known recently, as a technology for reducing the power consumption of an in-vehicle network using CAN, a partial network technology in which a gateway device switches power on/off individually for each bus according to the vehicle conditions.

For example, the CAN protocol (for example, ISO11898-6) defines a selective wakeup function for selectively waking up the ECUs that require communication among all the ECUs connected to the bus. The ECU is an abbreviation for Electronic Control Unit.

Further, there is a communication system (that is, a network system) composed of an ECU having a selective wakeup function. In this communication system, it is common for ECUs to manage the timing of sleep and wakeup by exchanging management signals for managing sleep (that is, low power consumption state)/wakeup (that is, activated state) with each other.

SUMMARY

According to an example of the present disclosure, a relay device is provided as follows. The relay device receives a plurality of wakeup frames from one or more than one communication device connected to each bus of a plurality of buses via a corresponding port. The relay device obtains an aggregated makeup pattern by aggregating information on an operating mode of each communication device included in the plurality of wakeup frames so as to include predetermined information to be transmitted and received and reduce the number of makeup patterns. By using the aggregated wakeup pattern obtained by aggregating the information on the operating mode, a wakeup frame for transmission to each bus via the corresponding port is prepared.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Embodiments of the present disclosure will be described with reference to the drawings.

1. First Embodiment

[1-1. Overall Configuration]

First, an overall configuration of a communication system according to a first embodiment will be described.

Figure 1:
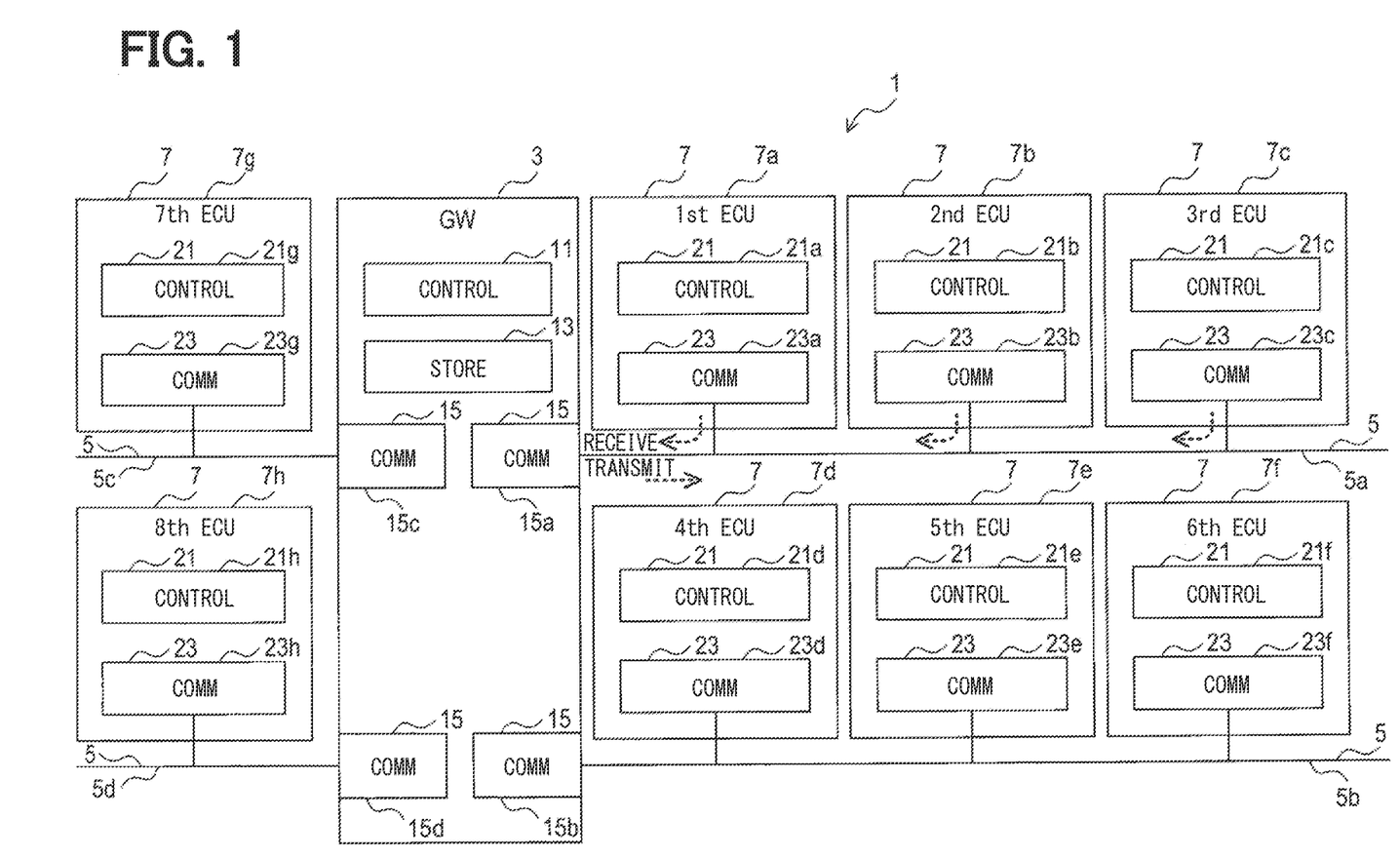
FIG. 1 is a block diagram showing a configuration of a communication system according to a first embodiment.

As shown in FIG. 1, a communication system 1 in the first embodiment is a communication system mounted on a vehicle. The communication system 1 includes a gateway device 3 (hereinafter, GW 3), a plurality of communication lines 5 (hereinafter, buses 5) connected to the GW 3, and a plurality of electronic control units 7 (hereinafter, ECUs 7) connected to each bus 5.

The GW 3 corresponds to a relay device that relays communication; the ECUs 7 corresponds to communication devices. That is, the GW 3 and the ECUs 7 are nodes in the communication system 1. In the first embodiment, the case where the number of buses 5 is four will be described as an example, but the present embodiment is not limited to this. When distinguishing each bus 5, the followings are used; a first bus 5a, a second bus 5b, a third bus 5c, and a fourth bus 5d.

Each bus 5 is connected to each other so as to be able to communicate with each other via the GW 3. One or more ECUs 7 (i.e., one or more than one ECU 7) are connected to each of first to fourth buses 5a to 5d. When distinguishing each ECU 7, the followings are used: a first ECU 7a, a second ECU 7b, and a third ECU 7c which are connected to a first bus 5a; a fourth ECU 7d, a fifth ECU 7e, and a sixth ECU 7f which are connected to a second bus 5b; a seventh ECU 7g which is connected to a third bus 5c; and an eighth ECU 7h which is connected to a fourth bus 5d.

In the communication system 1, communication is performed between each ECU 7 and the GW 3 via each bus 5 according to a CAN protocol (for example, ISO11898-6).

That is, the communication frame is transmitted and received. The CAN is an abbreviation for Controller Area Network.

For example, as will be described later, the communication system 1 is configured to transmit a wakeup frame for transmission prepared by aggregating information, to each bus 5. In the following, transmission means broadcasting. As is well known, this broadcast is to transmit a packet (for example, a makeup frame) to be received by all nodes on the same network without specifying a specific transmission destination. In the first embodiment, as will be described later, there is also a bus 5 that does not transmit a wakeup frame.

Each ECU 7 is arranged in corresponding part of the vehicle and realizes a function assigned in advance based on various information acquired by communication.

[1-2. Gateway Device]

Next, the GW 3 will be described.

The GW 3 can switch the operating mode between (i) an activated mode (i.e., wakeup mode), which is a normal mode in which communication for normal control data can be executed, and (ii) a sleep mode, which stops normal communication and consumes less power than the activated mode.

When the GW 3 includes at least a well-known gateway function for realizing communication between the ECUs 7 individually connected to different buses 5, while realizing communication according to the CAN protocol on each bus 5.

The GW 3 includes a gateway controller unit 11 (hereinafter, GW controller unit 11), a gateway storage unit 13 (hereinafter, GW storage unit 13), a plurality of gateway communicator units 15 (hereinafter, GW communicator unit 15) which are a plurality of gateway transceivers, and the like. Here, the controller unit may be also referred to as a controller. The communicator unit may be also referred to as a communicator or a transceiver. The storage unit may also be referred to as a storage.

Although not shown, as an example of the present embodiment, the GW controller unit 11 includes a well-known microcomputer having a CPU, ROM, RAM, and the like. The CPU performs gateway processing and the like according to the program recorded in the ROM. The CPU performs the process of realizing the so-called gateway function, such as receiving a communication frame from a certain bus 5 via the GW communicator unit 15, identifying the received communication frame based on the ID of the communication frame, and transferring the received communication frame to another bus 5, if necessary. The ID is an abbreviation for identification and is a sign or symbol used for own identification.

Further, in the first embodiment, as will be described later, the CPU performs processing such as aggregation of information, preparation of a wakeup frame, and transmission of a wakeup frame. Further, although not shown, the microcomputer includes a communication controller (hereinafter, GW communication controller) that performs communication processing according to the CAN protocol. The GW communication controller is provided for each GW communicator unit 15.

The various functions (for example, the information aggregation unit and the frame preparation unit) of the GW controller unit 11 are realized, as one example of the present disclosure, by the CPU executing a program stored in the non-transitory tangible storage medium. In this example, the ROM 42 corresponds to a non-transitory tangible storage medium that stores a program. Further, by executing this program, a method corresponding to the program is executed. The GW controller unit 11 may include one microcomputer or a plurality of microcomputers.

The GW communicator unit 15 is an interface IC, and is provided for each bus 5 connected to the GW 3, that is, for each communication controller. Each GW communicator unit 15 corresponds to each port to which each bus 5 is connected. That is, the GW communicator unit 15 corresponds to a terminal that inputs and/or outputs an electric signal corresponding to, for example, a communication frame.

When distinguishing each GW communicator unit 15, the followings are used: a first GW communicator unit 15a to which the first bus 5a is connected; a second GW communicator unit 15b to which the second bus 5b is connected; a third GW communicator unit 15c to which the third bus 5c is connected; and a fourth GW communicator unit 15d to which the fourth bus 5d is connected.

Although not shown, the GW communicator unit 15 includes a reception buffer for receiving a communication frame and a transmission buffer for transmitting a communication frame. The GW communicator unit 15 converts the communication frame output from the GW communication controller into an electric signal defined by CAN, and outputs the electric signal to each bus 5 via the transmission buffer. Further, the communication frame received from each bus 5 via the reception buffer is output to the GW communication controller.

The GW storage unit 13 is a rewritable storage including an EEPROM, a flash ROM, and the like.

[1-3. ECU]

Next, the ECU 7 will be described.

The ECU 7 can switch the operating mode between (i) an activated mode (that is, a wakeup mode), which is a normal mode capable of executing communication such as normal control data, and (ii) a sleep mode, which stops normal communication and reduces power consumption compared with the activated mode.

The ECU 7 includes (i) a controller unit 21 (hereinafter, an ECU controller unit 21) that executes control processing of each part of the vehicle and communication processing with other ECUs, and (ii) a communicator unit 23 (hereinafter, an ECU communicator unit 23) that is a transceiver that mediates between the ECU controller unit 21 and the bus 5. Here, the controller unit may be also referred to as a controller. The communicator unit may be also referred to as a communicator or a transceiver. The storage unit may also be referred to as a storage.

When distinguishing each ECU controller unit 21, the followings are used; first to eighth ECU controller units 21a to 21h which are provided in the first to eighth ECUs 7a to 7h, respectively. Although not shown, as an example of the present embodiment, the ECU controller unit 21 includes a well-known microcomputer having a CPU, ROM, RAM, and the like. Like the GW controller unit 11, the microcomputer includes a communication controller (not shown).

The ECU controller unit 21 basically has the same configuration as the GW controller unit 11, and will be briefly described. The microcomputer executes communication processing (for example, frame transmission (reception, arbitration processing, error processing, etc.) according to the CAN protocol via the communication controller and the ECU communicator unit 23. Further, by exchanging a message with another ECU 7 via the communication controller, the ECU communicator unit 23 executes various processes in cooperation with the other ECU 7.

The microcomputer is provided with a clock circuit (not shown) that generates an operating clock, and is configured so that the operation of the clock circuit can be stopped by stopping the power supply to the clock circuit. In this microcomputer, a crystal oscillator with high clock accuracy is used in the clock circuit.

The state in which the clock circuit of the microcomputer is operating corresponds to the state in which the operation mode of the ECU 7 is a wakeup mode. The state in which the clock circuit of the microcomputer is stopped corresponds to the state in which the operation mode of the ECU 7 is a sleep mode. Then, as is well known, the ECU 7 can transition to the wakeup mode (that is, wakeup) by detecting the dominant pulse on the bus 5 while the operating mode is the sleep state.

The ECU communicator unit 23 is an interface IC, and the ECU communicator unit 23 is also provided with a reception buffer and a transmission buffer (not shown), similarly to the GW communicator unit 15. The ECU communicator unit 23 converts a communication frame generated by the microcomputer into a communication signal that satisfies the electrical conditions of the bus 5 defined in advance, and transmits the communication frame via the bus 5.

The ECU communicator unit 23 includes a clock circuit (not shown) that generates an operating clock. Since this clock circuit is also activated even during the sleep of the ECU 7, it is possible to receive a predetermined communication frame (for example, a wakeup frame).

However, since the clock accuracy of the clock circuit of the ECU communicator unit 23 is lower than that of the clock circuit of the microcomputer, the decoding performance of the received communication frame or the like is also lower than that of the microcomputer, CR is used as the clock circuit of the ECU communicator unit 23.

When distinguishing each ECU communicator unit 23, the followings are used: first to eighth ECU communicator units 23a to 23 which are provided to the first to eighth ECUs 7a to 7h, respectively.

[1-4. Communication Frame]

Next, the communication frames transmitted and received by the communication system 1 will be described.

As the communication frame, in addition to the control frame used for transmitting and receiving various control data, a network management frame (that is, an NM frame) used for management of a communication system or the like is known.

Among the NM frames, the wakeup frame is used for transmitting and receiving information on the operating mode being a wakeup state or a sleep state of each ECU 7. In the first embodiment, the wakeup frame is set to be broadcast in the communication system 1.

Figure 2:
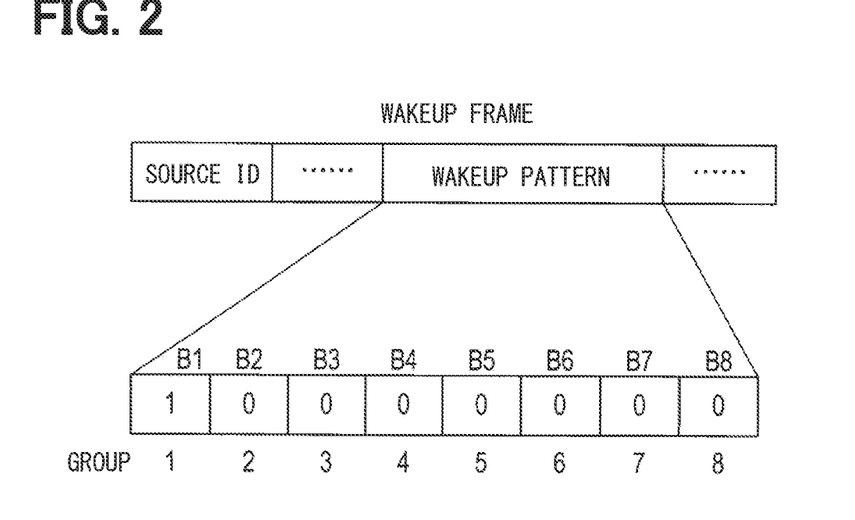
FIG. 2 is an explanatory diagram schematically showing a configuration example of a format of a wakeup frame.

In the following, wakeup may be referred to as "WakeUp" or simply "WU". Also, the wakeup frame may be simply referred to as "WUF". As shown in FIG. 2, the area of the source ID is set at the beginning of the communication frame. The source ID is uniquely assigned so that different ECUs 7 do not have the same value, and even the same ECU 7 is assigned a different ID depending on the type of frame.

In the first embodiment, since the wakeup frame is used as the communication frame, the source ID includes information indicating the wakeup frame. Therefore, the other ECU 7 that receives the communication frame can identify the type of the frame based on the source ID. That is, it is possible to identify that the received communication frame is a wakeup frame based on the source ID.

An 8-bit wakeup pattern (that is, a WakeUp pattern) is stored in this wakeup frame. That is, the plurality of ECUs 7 are classified into eight groups. Eight groups are assigned in an ascending order from the beginning of the wakeup pattern; information for setting the operating mode (i.e., wakeup state or sleep state) of each group is recorded in the wakeup pattern in sequence.

That is, from the beginning position (that is, the first bit position B1) to the last position (that is, the eighth bit position B8) of the wakeup pattern, the signal state of each bit position B1, B2, B3, B4, B5, B6, B7, and B8 are set to indicate the states of a first group to an eighth group, respectively.

Therefore, the wakeup pattern can be said to be a collection of information (that is, a group of information) including wakeup state and sleep state of each group of ECUs 7 when a plurality of groups of ECUs 7 are connected to the communication system 1.

For example, when the signal state of the first bit position B1 is "1", it indicates that the state of the ECU 7 belonging to the first group is wakeup. On the other hand, when the signal state of the first bit position B1 is "0", it indicates that the state of the ECU 7 belonging to the first group is sleep.

Therefore, for example, if the ECU 7 of the first group receives the wakeup frame as shown in FIG. 2, it can be seen that the ECU 7 of the first group needs to wake up. Therefore, when the ECU 7 of the first group is in the sleep state, for example, the ECU 7 of the first group transitions to the wakeup state.

On the other hand, if the ECU 7 of another group other than the first group receives the wakeup frame as shown in FIG. 2, it can be seen that the ECU 7 of another group other than the first group is not necessary to wake up. Therefore, when the ECU 7 of another group is in the sleep state, for example, the sleep state is maintained.

In FIG. 2, the first bit position B1 at the beginning is "1". However, assume a case where the fifth bit position B5 is also "1". In such a case, both the ECU 7 of the first group and the ECU 7 of the fifth group need to wake up. That is, it is shown that each ECU 7 having the wakeup pattern shown in FIG. 3 belongs to the first group and the fifth group.

[1-5. Information Aggregation Method]

Next, a method of aggregating the information of the wakeup pattern will be described. In the first embodiment, first, the GW controller unit 11 aggregates information on the wakeup patterns included in a plurality of wakeup frames received by a certain GW communicator unit 15. Specifically, for the wakeup patterns of a plurality of wakeup frames, the information included in each wakeup pattern is aggregated by using a logical add. Note that "information" is basically uncountable; however, in the present disclosure, it may be desirable to regard "information" as countable. In order to make clear "information" being countable, "an information item" or "information items" may be used explicitly.

When only one ECU 7 is connected to the bus 5 connected to a certain GW communicator unit 15, the above-mentioned aggregation in the certain GW communicator unit 15 is unnecessary. In this case, the wakeup pattern for port, which will be described later, is the same as the wakeup pattern in the wakeup frame corresponding to the one ECU 7, which the certain GW communicator unit 15 receives. In the following, this case (that is, the case where it is not aggregated) is also referred to as a wakeup pattern for port.

In the first embodiment, the above-mentioned aggregation is carried out for each GW communicator unit 15. That is, for each GW communicator unit 15, a plurality of information (i.e., information items) on the wakeup patterns included in a plurality of wakeup frames received by each GW communicator unit 15 are aggregated to obtain an aggregated wakeup pattern. The information of the thus aggregated wakeup pattern (i.e., the information on the makeup pattern indicating the operating mode of each ECU 7) is stored in the GW storage unit 13.

In the following, the aggregated wakeup pattern for each GW communicator unit 15 in this way may be referred to as a wakeup pattern for port or a wakeup pattern for port reception corresponding to each GW communicator unit 15.

Further, in the first embodiment, when a wakeup frame is transmitted from a certain GW communicator unit 15 to the bus 5 connected to the certain GW communicator unit 15, a makeup frame for transmission is prepared in advance before the wakeup frame is transmitted.

Specifically, the information of the wakeup pattern for port corresponding to each GW communicator unit 15 other than the certain GW communicator unit 15 that performs transmission is aggregated. The wakeup pattern whose information is aggregated (that is, the aggregated wakeup pattern) is included in the wakeup frame for transmission from the certain GW communicator unit 15.

When preparing the wakeup frame for transmission transmitted from the certain GW communicator unit 15, the information of the wakeup pattern for port corresponding to the certain GW communicator unit 15 is not aggregated. That is, the wakeup pattern for port corresponding to this port (that is, for the transmitting certain GW communicator unit 15 itself) is excluded in advance from being aggregated.

Hereinafter, the method of aggregating the above-mentioned information will be described in more detail.

<Method of Preparing Wakeup Pattern for Port by Aggregating>

Figure 3:
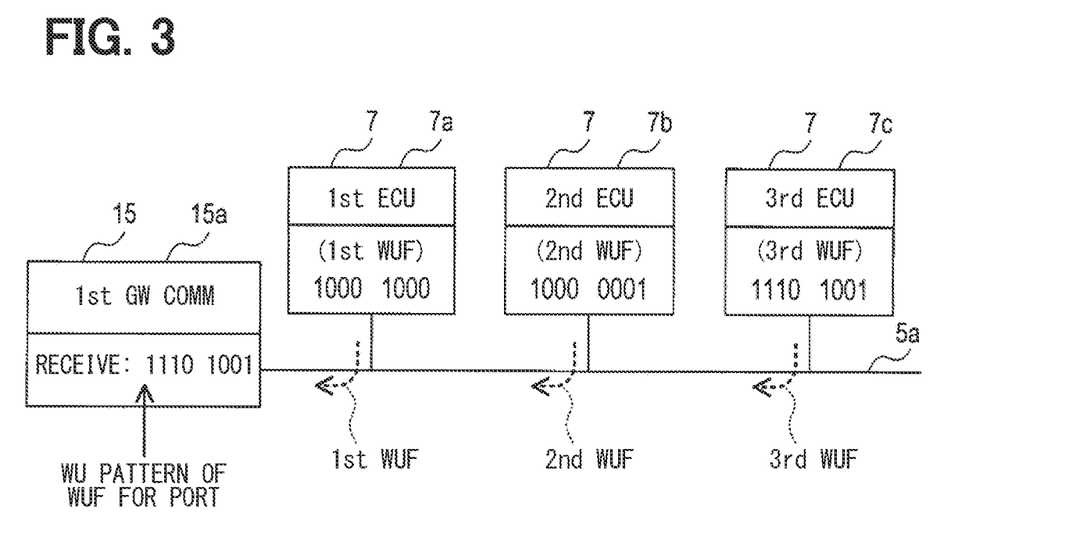
FIG. 3 is an explanatory diagram showing a state of transmission/reception of a wakeup frame between a first GW communicator unit and each ECU connected to a bus.

Here, as shown in FIG. 3, an example is taken from a case where a GW communicator unit 15 (for example, the first GW communicator unit 15*a*) transmits and receives a wakeup frame (that is, WUF).

First, a wakeup frame (that is, a first WUF) having a wakeup pattern of "1000 1000" is transmitted from the first ECU 7*a* to the first GW communicator unit 15*a* via the first bus 5*a*.

Further, the second ECU 7*b* transmits a makeup frame (that is, a second WUF) having a wakeup pattern of "1000 0001" to the first GW communicator unit 15*a* via the first bus 5*a*.

Yet further, the third ECU 7*c* transmits a wakeup frame (that is, a third WUF) having a wakeup pattern of "1110 1001" to the first GW communicator unit 15*a* via the first bus 5*a*.

Therefore, the first GW communicator unit 15*a* that has received the first to third WUF transmits the received information items to the GW controller unit 11. The GW controller unit 11 thereby aggregates the information items of the wakeup patterns of the first to third WUFs to prepare a wakeup pattern for port corresponding to the first GW communicator unit 15*a*.

Figure 4:
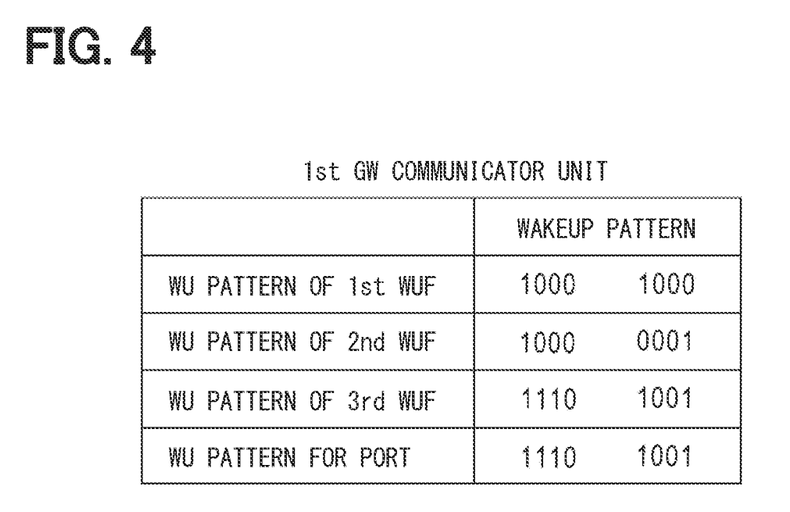
FIG. 4 is an explanatory diagram showing each wakeup pattern of a plurality of wakeup frames received by a first GW communicator unit.

Specifically, as shown in FIG. 4, with respect to the first to third WUF wakeup patterns, a logical add (that is, OR or inclusive OR) of the respective information items corresponding to the respective bit positions is taken (that is, aggregated) to prepare a wakeup pattern for port.

That is, for each wakeup pattern, the OR of the signal state (that is, "1" or "0") of each bit position B1, B2, B3, B4, B5, B6, B7, B8 is taken to prepare a wakeup pattern for port.

Therefore, here, a wakeup pattern of "1110 1001" is prepared as a wakeup pattern for port corresponding to the first GW communicator unit 15*a*. In FIG. 3, a wakeup pattern for port is described at the "receive" position.

<Method of Preparing Wakeup Pattern for Transmission by Aggregating>

Figure 5:
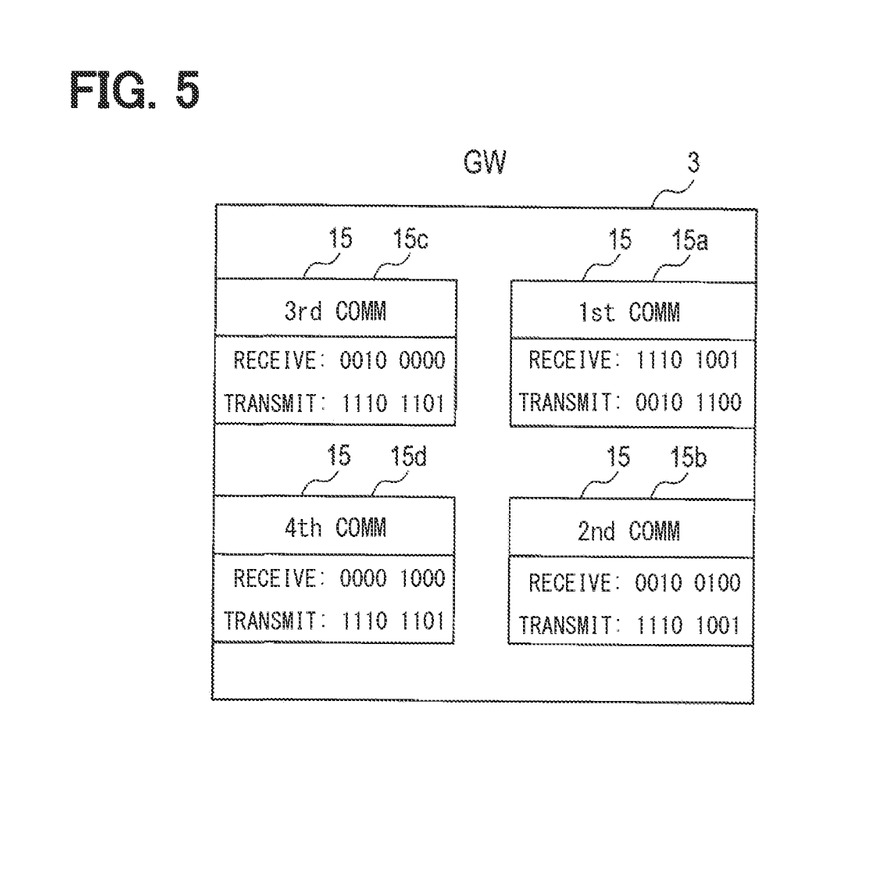
FIG. 5 is an explanatory diagram showing a wakeup pattern for port corresponding to each GW communicator unit and a wakeup pattern for transmission from each GW communicator unit.

Here, the case as shown in FIG. 5 is taken as an example in which (i) a wakeup pattern for port corresponding to each GW communicator unit 15 is prepared, and further. (ii) a wakeup pattern (that is, a wakeup pattern for transmission) used for the wakeup frame for transmission transmitted by each GW communicator unit 15 is prepared.

In FIG. 5, a wakeup pattern for port is described at the "receive" position, and a wakeup pattern for transmission is described at the "transmit" position. For example, suppose a case where a wakeup frame is transmitted from the first GW communicator unit 15*a*. Such a case aggregates information items of the wakeup patterns for port (that is, see "receive") corresponding to three ports of the second GW communicator unit 15*b*, the third GW communicator unit 15*c*, and the fourth GW communicator unit 15*d*, except for the wakeup pattern for port corresponding to the first GW communicator unit 15*a*. As a result, the GW 3 obtains a wakeup pattern for transmission (that is, see "transmit" in FIG. 5) that is used or included in the wakeup frame for transmission transmitted from the first GW communicator unit 15*a*.

Figure 6:
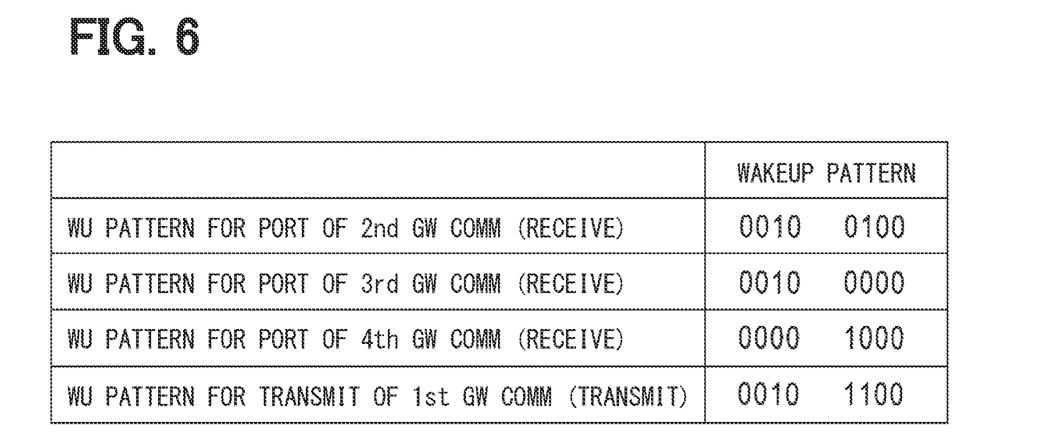
FIG. 6 is an explanatory diagram showing a wakeup pattern for port corresponding to each of second to fourth GW communicator units and a wakeup pattern for transmission from a first GW communicator unit.

Specifically, as shown in FIG. 6, with respect to the wakeup patterns for port corresponding to the three ports of the second to fourth GW communicator units 15*b* to 15*d*, the OR of the information items corresponding to each bit position is taken to prepare a wakeup pattern for transmission.

Therefore, here, the wakeup pattern of "0010 1100" is prepared as the wakeup pattern for transmission in the first GW communicator unit 15*a*. In this way, the wakeup frame for transmission including the wakeup pattern for transmission which is obtained by aggregating the information is prepared in each of the GW communicator units 15*a* to 15*d*, and this wakeup frame for transmission is transmitted (that is, broadcast) from each GW communicator unit 15 to each bus 5. Therefore, each ECU 7 can determine its own wakeup state or sleep state based on the received wakeup frame for transmission.

[1-6. Process]

Next, processes in each part of the communication system 1 will be described.

<Process in GW>

First, a process executed by the microcomputer of the GW controller unit 1 in the GW 3 will be described.

Figure 7:
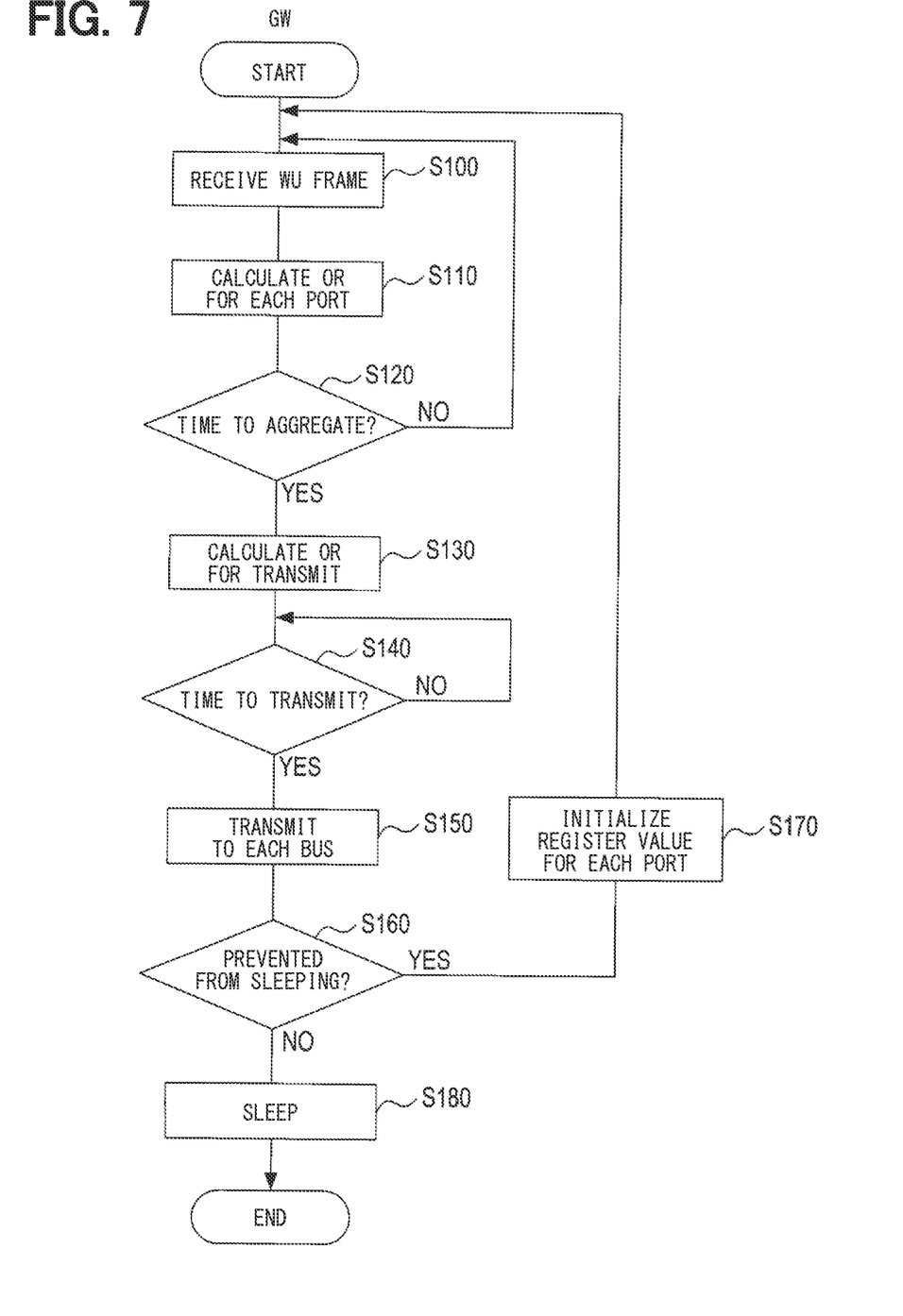
FIG. 7 is a flowchart showing an example of a process in a GW according to the first embodiment.

This process is a process for transmitting and receiving wakeup frames in the GW 3. As shown in FIG. 7, in Step 100 (hereinafter, S100), each GW communicator unit 15 receives a wakeup frame transmitted from each ECU 7 via each bus 5 to which each ECU 7 is connected.

In the following S110, information items indicating wakeup or sleep (that is, information items included in the wakeup patterns) included in the plurality of wakeup frames received by each GW communicator unit 15 are aggregated by taking OR as shown in FIG. 4. Thereby, a makeup pattern for port (i.e., an aggregated wakeup pattern) is prepared. That is, a wakeup pattern for port corresponding to each GW communicator unit 15 is prepared.

In the following S120, it is determined whether or not it is a time (i.e., aggregating time) to aggregate the wakeup patterns used for the wakeup frame for transmission that is transmitted from each GW communicator unit 15. If an affirmative determination is made here, the process proceeds to S130, while if a negative determination is made, the process returns to S100.

The aggregating time includes, for example, a time at which a predetermined period of time (for example, 1 sec) has elapsed from the previous aggregation. Further, for example, the aggregating time may be a time when a certain wakeup pattern has a predetermined change.

In S130, since it is the time to aggregate the wakeup patterns used for the wakeup frame for transmission, information items on the wakeup patterns are aggregated in order to prepare a wakeup frame for transmission that is transmitted from each GW communicator unit 15.

That is, as described above, in order to prepare a wakeup frame for transmission that is transmitted from a certain GW communicator unit 15 among the plurality of GW communicator units 15, the wakeup pattern for transmission (that is, the aggregated wakeup pattern) is prepared by taking the OR of the information items of the wakeup patterns for port corresponding to the other GW communicator units 15 other than the certain GW communicator unit 15.

As a result, a wakeup frame for transmission corresponding to each GW communicator unit 15 can be prepared. In the following S140, it is determined whether or not it is a time to transmit the wakeup frame for transmission. If an affirmative determination is made here, the process proceeds to S150, while if a negative determination is made, the process stands by.

In S150, since it is the time to transmit, each GW communicator unit 15 transmits a makeup frame for transmission corresponding to each GW communicator unit 15, to each bus 5. In the following S160, it is determined whether or not the condition for prohibiting the sleep (that is, the low power consumption mode) of the GW 3 itself is satisfied. If an affirmative determination is made here, the process proceeds to S170, while if a negative determination is made, the process proceeds to S180.

The condition for prohibiting the sleep of the GW 3 is satisfied by the result of aggregating all the wakeup patterns being not zero (that is, "0000 0000"). That is, if it is zero, it can be considered that the sleep condition is satisfied.

In S170, since the GW 3 is not in sleep, each GW communicator unit 15 initializes the value (that is, the register value) of the storage area that stores the data received from each ECU 7, and the process returns to the S100.

On the other hand, in S180, since the sleep condition is satisfied, the GW 3 is put to sleep, and this process is temporarily ended.

<Process in ECU>

Next, a process executed by the microcomputer in the ECU controller unit 21 in the ECU 7 will be described.

Figure 8:
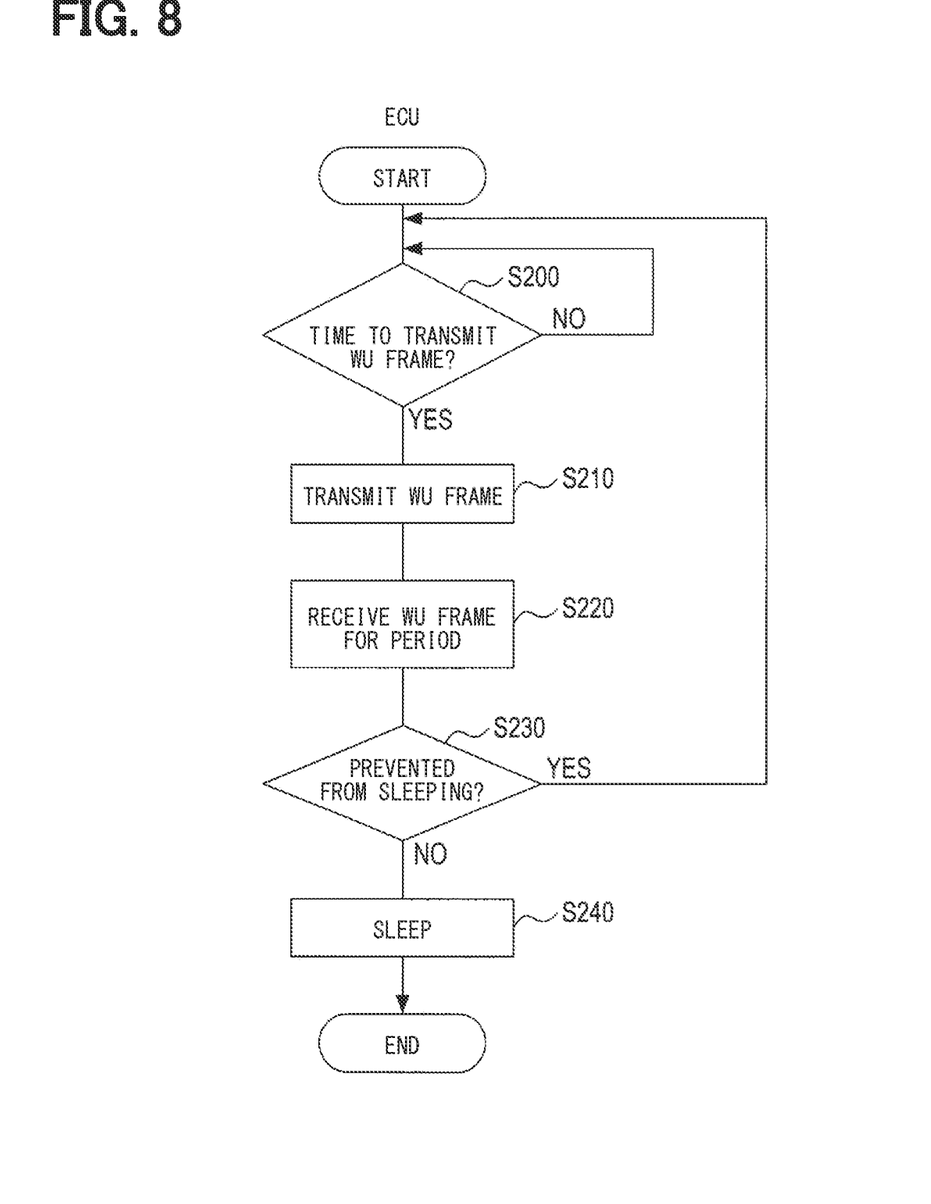
FIG. 8 is a flowchart showing an example of a process in an ECU according to the first embodiment.

As shown in FIG. 8, in S200, it is determined whether or not it is a time to transmit the wakeup frame. If an affirmative determination is made here, the process proceeds to S210, while if a negative determination is made, the process stands by. In S210, since it is the time to transmit of the wakeup frame, the wakeup frame is transmitted to the bus 5 to which the ECU 7 is connected.

In the following S220, the wakeup frame is received from the bus 5 for a certain period of time. Since the received wakeup frame includes wakeup and sleep information for each group of the ECUs 7, the operation of the ECU 7 itself can be determined based on this information.

In the following S230, it is determined whether or not the condition for prohibiting the sleep of the ECU 7 itself is satisfied. If an affirmative determination is made here, the process returns to S200, the operations of S200 to S220 are repeated, and if a negative determination is made, the process proceeds to S240.

The condition for prohibiting the sleep of the ECU 7 is satisfied by the result of aggregating the wakeup pattern information of the wakeup frame received within a certain period of time being not zero (that is, "0000 0000"). That is, if it is zero, it can be considered that the sleep condition is satisfied.

On the other hand, in S240, since the sleep condition is satisfied, the ECU 7 is put to sleep, and this process is temporarily ended. When the ECU 7 is put to sleep, a wakeup condition is set in advance.

[1-7. Effect]

In the first embodiment described above, the following effects can be obtained.

(1a) In the first embodiment, when a plurality of wakeup frames from one bus 5 are received by the GW 3, the plurality of wakeup frames are not transmitted to another bus 5 as they are (i.e., directly or unchanged), but a plurality of information items indicating the operating mode included in the plurality of wakeup frames are aggregated.

That is, an aggregated wakeup pattern is obtained by aggregating the information items each indicating the operating mode (i.e., operating mode information item), such that the information on the operating mode of each ECU 7 required for transmission/reception, which is the predetermined information to be transmitted/received, is included and the number (i.e., a counted number) of wakeup patterns is reduced. Then, a wakeup frame for transmission is prepared by using the wakeup pattern in which the information is aggregated in this way.

Therefore, when transmitting a wakeup frame for transmission including a wakeup pattern in which information is aggregated in this way to each bus 5 of the transmission destination, the amount of communication can be reduced as compared with the case where each wakeup frame is transmitted without the information aggregated. As a result, the communication load (that is, the bus load) on the buses 5 can be suppressed.

(1b) In the first embodiment, suppose a case where a certain bus 5 is connected to several ECUs 7. In such a case, when several wakeup frames are received from the several ECUs 7 via the certain bus 5 and a certain GW communicator unit 15 connected to the certain bus 5, information items indicating the operating mode included in the several wakeup frames are aggregated to obtain a wakeup pattern for port corresponding to the certain GW communicator unit 15.

In this way, when obtaining an aggregated wakeup pattern for port corresponding to each GW communicator unit 15, the number of the wakeup patterns for transmission and the number of the wakeup frames for transmission which are transmitted from each GW communicator unit 15 can be reduced as compared with the case where they are not aggregated. Therefore, the bus load when transmitting the wakeup patterns for transmission or the wakeup frames for transmission can be reduced.

(1c) In the first embodiment, when a wakeup frame for transmission to be transmitted from a certain GW communicator unit 15 is prepared, the wakeup pattern for port corresponding to the certain GW communicator unit 15 is excluded from being aggregated to obtain the aggregated wakeup pattern used for the wakeup frame for transmission.

As a result, the burden of processing the information can be reduced.

(1d) In the first embodiment, suppose a case where a wakeup frame for transmission to be transmitted from a certain GW communicator unit 15 is prepared when there are other several GW communicator units 15 other than the certain GW communicator unit 15. In such a case, information items indicating the operating mode included in the wakeup patterns for port corresponding to the other several GW communicator units 15 are aggregated to obtain the wakeup pattern used for the wakeup frame for transmission.

As a result, the burden of processing the information can be reduced. Note that the wakeup patterns for port corresponding to other several GW communicator units 15 may include (i) a wakeup pattern for port that is obtained by aggregating with respect to the GW communicator unit 15 connected to the bus 5 to which several ECUs 7 are connected, and (ii) a wakeup pattern for port that is obtained by not aggregating with respect to the GW communicator unit 15 connected to the bus 5 to which only one ECU 7 is connected.

(1e) In the first embodiment, when a plurality of information items each indicating the operating mode included in the plurality of wakeup frames are aggregated, a logical add (i.e., OR or inclusive OR) of the plurality of information items each indicating the operating mode is taken.

As a result, the information items can be easily aggregated by including the information of the operating mode to be transmitted/received (that is, the required information of the operating mode).

(1f) In the first embodiment, the ECU 7 that has received the wakeup frame for transmission can determine its own state based on the information indicating the operating mode included in the received wakeup frame.

(1g) In the first embodiment, the wakeup frame stores information indicating the operating mode of the ECU 7 in each of the groups which a plurality of ECUs 7 are classified into or belong to.

Therefore, by transmitting and receiving this wakeup frame, the operating mode of the entire group can be specified.

[1-8. Wording]

In the first embodiment in the present disclosure, the communication system 1 may correspond to a communication system. The GW 3 may correspond to a relay device. The bus 5 may correspond to a bus. The ECU 7 may correspond to a communication device. Further, the GW controller unit 11 and its processing (S100, S130) may correspond to an information aggregation unit or a controller. The GW controller unit 11 and its processing (S130) may correspond to a frame preparation unit or controller.

2. Second Embodiment

Since the basic configuration of a second embodiment is the same as that of the first embodiment, the differences from the first embodiment will be mainly described below. The same reference signs as in the first embodiment denote the same elements or components, and reference is made to the preceding description.

The second embodiment is different from the first embodiment mainly in that a plurality of gateway devices (that is, GW) are connected via a backbone line, and thus the differences will be mainly described.

[2-1. Communication System]

Figure 9:
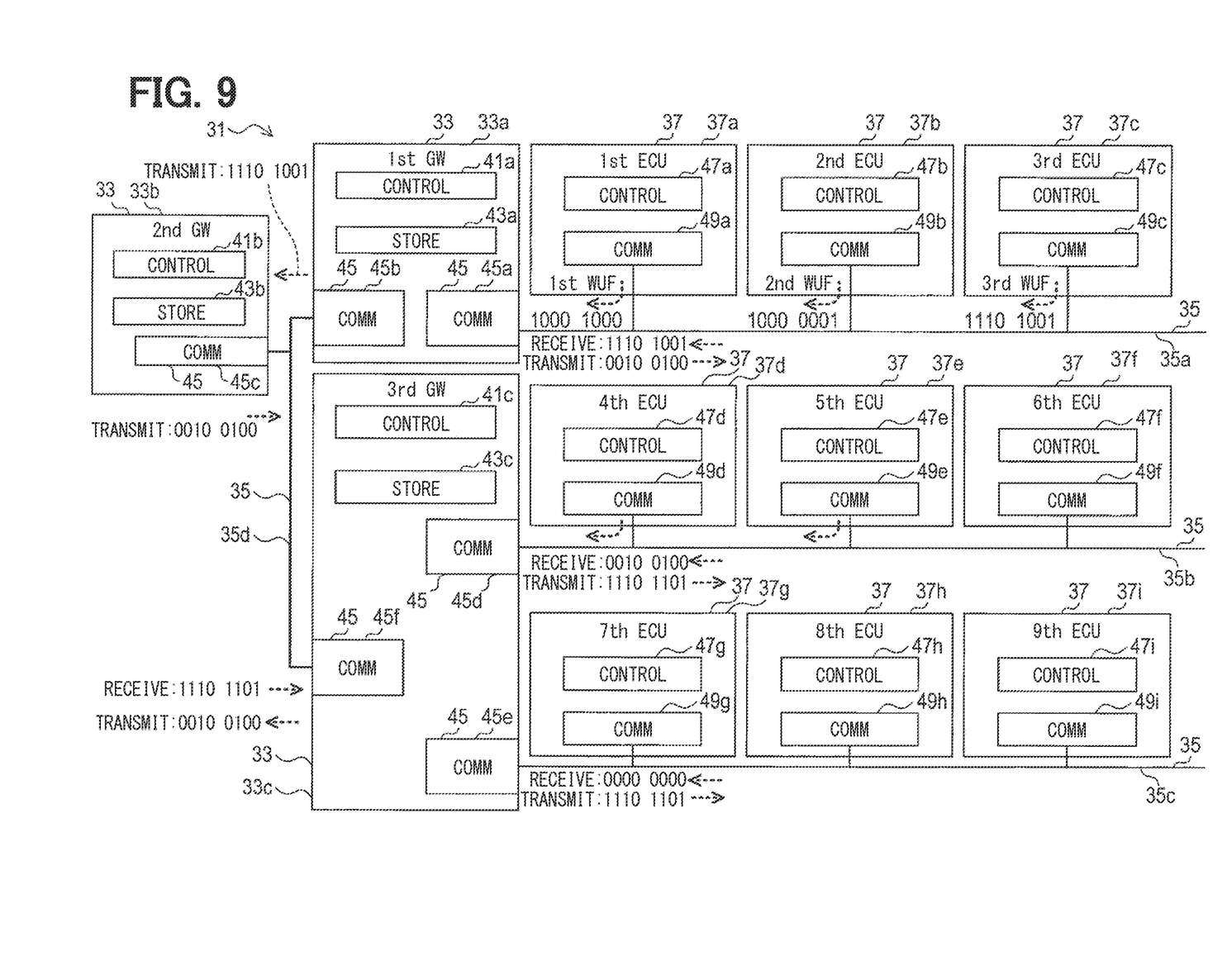
FIG. 9 is a block diagram showing a configuration of a communication system according to a second embodiment.

As shown in FIG. 9, a communication system 31 in the second embodiment includes a plurality of GWs 33, a plurality of buses 35 connected to each GW 33, and a plurality of ECUs 37 connected to each bus 35.

The GW 33 includes a first GW 33a, a second GW 33b, and a third GW 33c. Each GW 33a, 33b, and 33c is basically the same as the GW 3 of the first embodiment. The first GW 33a includes a first GW controller unit 41a and a first GW storage unit 43a. The second GW 33b includes a second GW controller unit 41b and a second GW storage unit 43b. The third GW 33c includes a third GW controller unit 41c and a third GW storage unit 43c. The GW controller units 41a to 41c and the GW storage units 43a to 43c are, respectively, the same as the GW controller unit 11 and the GW storage unit 13 of the first embodiment.

Further, each GW 33 includes a GW communicator unit 45. That is, the first GW 33a includes two first GW communicator units 45a and 45b. The second GW 33b includes one second GW communicator unit 45c. The third GW 33c includes three third GW communicator units 45d, 45e, and 45f. Each GW communicator unit 45 is the same as the GW communicator unit 15 of the first embodiment.

Of the buses 35, a plurality of ECUs 37 are connected to the first to third buses 35a to 35c, individually. For example, the first ECU 37a, the second ECU 37b, and the third ECU 37c are connected to the first bus 35a. The fourth ECU 37d, the fifth ECU 37e, and the sixth ECU 37f are connected to the second bus 35b. The seventh ECU 37g, the eighth ECU 37h, and the ninth ECU 37i are connected to the third bus 35c.

The first bus 35a is connected to the first GW communicator unit 45a. The second bus 35b is connected to the third GW communicator unit 45d. The third bus 35c is connected to the third GW communicator unit 45e.

The configuration of each ECU 37 is the same as that of the ECU 7 of the first embodiment. The first to ninth ECUs 37 are provided, respectively, with the first to ninth ECU controller units 47a to 47i and the first to ninth ECU communicator units 49a to 49i.

Further, among the buses 35, the fourth bus 35d is a backbone line connecting the GWs 33 to each other. This backbone line connects the first GW communicator unit 45b, the second GW communicator unit 45c, and the third GW communicator unit 45f. The backbone line is a bus having a higher communication capacity (for example, a larger upper limit of the communication amount per unit time) than a local line such as the first to third buses 35a to 35c.

The transmission in the communication system 1 is performed by broadcasting.

[2-2. Methods of Information Aggregation and Transmission/Reception]

Next, a method of aggregating information and transmitting and receiving frames will be described.

<Reception>

The following will describe an example where the first GW communicator unit 45a receives (i) a first WUF having a WU pattern of "1000 1000" from the first ECU 37a, (ii) a second WUF having a WU pattern of "1000 0001" from the second ECU 37b, and (iii) a third WUF having a WU pattern of "1110 1001" from the third ECU 37c.

In this case, a wakeup pattern of "1110 1001" for port corresponding to the first GW communicator unit 45a is prepared by aggregation by OR as in the first embodiment. The wakeup pattern for port is described in the "receive" position.

In the same manner, for example, a wakeup pattern of "0010 0100" for port corresponding to the third GW communicator unit 45d is prepared by aggregation. For example, a wakeup pattern of "0000 0000" for port corresponding to the third GW communicator unit 45e is prepared by aggregation.

<Transmission>

For example, suppose a case where a wakeup frame transmitted from the first GW communicator unit 45b of the first GW 33a. Such a case uses the wakeup pattern of "1110 1001" for port corresponding to the first GW communicator unit 45a which is obtained by aggregating the information items of a plurality of wakeup frames received by the first GW communicator unit 45a.

That is, a wakeup frame for transmission including the wakeup pattern for port corresponding to the first GW communicator unit 45a is prepared, and the wakeup frame for transmission is output (that is, transmitted) to the fourth bus 35d, which is a backbone line. The transmission in the second embodiment is a broadcast.

On the other hand, suppose a case where the wakeup frame for transmission is transmitted from the first GW communicator unit 45a of the first GW 33a. Such a case uses the wakeup pattern of "0010 0100" for port corresponding to the first GW communicator unit 45b which is obtained by aggregating the information items of a plurality of makeup frames received by the first GW communicator unit 45b.

That is, a wakeup frame for transmission including the wakeup pattern for port corresponding to the first GW communicator unit 45b is prepared, and the wakeup frame for transmission is transmitted to the first bus 35a, which is a local line.

In addition, suppose a case where a wakeup frame for transmission is transmitted from the second GW communicator unit 45c of the second GW 33b. Such a case transmits a wakeup frame for transmission including the wakeup pattern of "0010 0100" to the fourth bus 35d, which is a backbone line.

The wakeup frames transmitted from the first GW communicator unit 45b and the second GW communicator unit 45c are received by the third GW communicator unit 45f. Therefore, in the third GW 33c, a wakeup pattern for port corresponding to the third GW communicator unit 45f is prepared by aggregation. Here, the wakeup pattern for port corresponding to the third GW communicator unit 45f is "1110 1101".

Further, suppose a case where a wakeup frame for transmission is transmitted from the third GW communicator unit 45d of the third GW 33c. Such a case aggregates the information items of the wakeup patterns for port obtained from the wakeup frames received by the third GW communicator unit 45e and the third GW communicator unit 45f, which are other than the third GW communicator unit 45d itself.

Here, the makeup pattern for port corresponding to the third GW communicator unit 45e is "0000 0000", and the wakeup pattern for port corresponding to the third GW communicator unit 45f is "1110 1101". Therefore, taking ORs of those, the wakeup pattern after aggregation is "1110 1101".

Therefore, the third GW communicator unit 45d transmits a wakeup frame including the aggregated wakeup pattern to the second bus 35b. Suppose a case where a wakeup frame for transmission is transmitted from the third GW communicator unit 45e. Such a case aggregates the information items of the wakeup patterns for port obtained from the plurality of wakeup frames received by the third GW communicator unit 45d and the third GW communicator unit 45f, which are other than the third GW communicator unit 45e itself.

Here, the wakeup pattern for port corresponding to the third GW communicator unit 45d is "0010 0100", and the wakeup pattern for port corresponding to the third GW communicator unit 45f is "1110 1101". Therefore, taking ORs of those, the wakeup pattern after aggregation is "1110 1101".

Therefore, the third GW communicator unit 45e transmits a wakeup frame including the aggregated wakeup pattern to the third bus 35c. On the other hand, suppose a case where a wakeup frame is transmitted from the third GW communicator unit 45f. In such a case, since the wakeup frame is transmitted to the backbone line having high communication performance, it is not necessary to aggregate the wakeup patterns for port as described above.

That is, the third GW communicator unit 45f transmits the following two wakeup frames together: the wakeup frame for transmission including the wakeup pattern for port corresponding to the third GW communicator unit 45d; and the wakeup frame for transmission including the wakeup pattern for port corresponding to the third GW communicator unit 45e.

Here, since the wakeup pattern for port corresponding to the third GW communicator unit 45e is "0000 0000", the wakeup frame for transmission including the wakeup pattern for port corresponding to the third GW communicator unit 45e is not transmitted.

On the other hand, apart from the above-mentioned method, as a process related to the third GW communicator unit 45f, the information items of the wakeup patterns for port corresponding to the other ports may be aggregated, and the wakeup frame for transmission including the aggregated wakeup pattern may be transmitted.

This case aggregates the information items of the wakeup patterns for port obtained from the plurality of wakeup frames received by the third GW communicator unit 45d and the third GW communicator unit 45e, which are other than the third GW communicator unit 45f itself.

Here, the wakeup pattern for port corresponding to the third GW communicator unit 45d is "0010 0100", and the wakeup pattern for port corresponding to the third GW communicator unit 45e is "0000 0000". Therefore, when taking OR of those, the wakeup pattern after aggregation is "0010 0100".

Therefore, in this case, the third GW communicator unit 45f transmits a wakeup frame for transmission including the aggregated wakeup pattern to the fourth bus 35d, which is a backbone line.

[2-3. Process]

Next, the process executed by the microcomputer of the GW 33 will be described.

Figure 10:
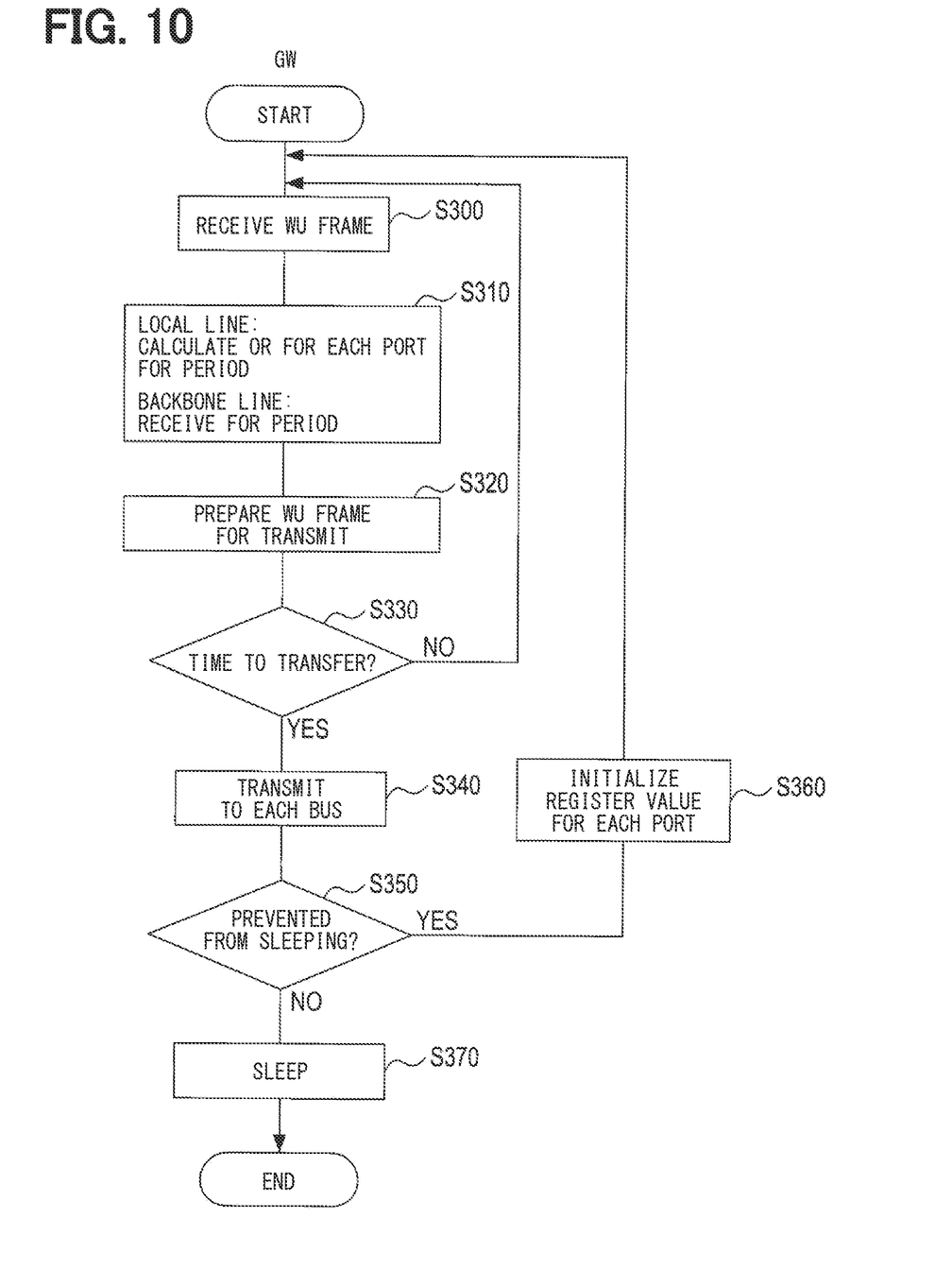
FIG. 10 is a flowchart showing an example of a process in a GW according to the second embodiment.

This process is a process for transmitting and receiving wakeup frames in the GW 33. As shown in FIG. 10, in S300, the wakeup frame transmitted from each ECU 37 and the wakeup frame transmitted from each GW 33 are received via each GW communicator unit 45 to which each bus 35 is connected.

In the following S310, for example, when the bus 35 is a local line, the following takes place. That is, each GW communicator unit 45, which the local line is connected to, aggregates by taking an OR of information items indicating wakeup or sleep included in a plurality of wakeup frames received from each ECU 37 within a certain period of time, to prepare a wakeup pattern for port.

Also, for example, when the bus 35 is a backbone line, the following takes place. That is, a wakeup pattern for port corresponding to each GW communicator unit 45, which the backbone line is connected to, is prepared by aggregating the information items of the wakeup patterns in a plurality of wakeup frames received from other GWs 33 within a certain period of time.

In the following S320, a wakeup frame for transmission from each GW communicator unit 45 is prepared by using the wakeup patterns for port obtained as described above.

For example, as described above, when a wakeup frame is transmitted to the local line, the information item(s) of the wakeup frame(s) for port corresponding to the other GW communicator unit 45(s) other than the GW communicator unit 45 itself to be transmitted is (are) aggregated to prepare a wakeup frame for transmission.

On the other hand, when the wakeup frame is transmitted to the backbone line, without performing the aggregation described above, a wakeup frame for transmission from each GW communicator unit 45 is prepared by using the wakeup frames or the wakeup patterns for port corresponding to the other GW communicator units 45 other than the GW communicator unit 45 itself.

In the following S330, it is determined whether or not it is a time to transfer (that is, the transmission time) of the wakeup frame for transmission. If an affirmative determination is made here, the process proceeds to S340, while if a negative determination is made, the process returns to S300. As the transmission time, the same contents as those in the first embodiment can be adopted.

In S340, since it is the transmission time, each GW communicator unit 45 transmits a wakeup frame for transmission corresponding to each GW communicator unit 45, to each bus 35. For example, suppose that a wakeup frame for transmission is transmitted from one GW communicator unit 45 to a local line. Such a makeup frame for transmission is prepared to include a wakeup pattern obtained by aggregating the information item(s) on the wakeup pattern(s) for port corresponding to the GW communicator unit(s) 45 other than the one GW communicator unit 45 itself.

On the other hand, suppose that a wakeup frame for transmission is transmitted from one GW communicator unit 45 to a backbone line. In such a case, the wakeup frames for transmission including the wakeup patterns for port corresponding to the other GW communicator units 45 other than the one GW communicator unit 45 itself are transmitted together.

In the following S350, it is determined whether or not the condition for prohibiting the sleep of the GW itself (that is, the low power consumption mode) is satisfied. If an affirmative determination is made here, the process proceeds to S360, while if a negative determination is made, the process proceeds to S370.

As the condition for prohibiting the sleep of the GW 33, the same contents as those in the first embodiment can be adopted.

In S360, since the GW 33 is not in sleep, the register value is initialized and the process returns to S300 as in the first embodiment.

On the other hand, in S370, since the sleep condition is satisfied, the GW 33 is put to sleep, and this process is temporarily ended.

Since the processing in each ECU 37 is the same as that in the first embodiment, the description thereof will be omitted.

The second embodiment has the same effects as those of the first embodiment.

3. Other Embodiments

Although an embodiment of the present disclosure has been described above, the present disclosure is not limited to the above-described embodiment, and it is possible to implement various modifications.

(3a) In the present disclosure, an example in which a plurality of GWs and a plurality of ECUs are used in the communication system is given, but the number of ECUs and the number of GWs used in the communication system are not particularly limited.

(3b) The controllers (i.e., the GW controller unit 11, 41 in the above embodiments) and methods described in the present disclosure may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

Further, the computer program product may be stored in a computer-readable non-transitory tangible storage medium as instructions to be executed by a computer. The technique for realizing the functions of each unit included in the controller unit does not necessarily need to include software, and all the functions may be realized using one or a plurality of hardware circuits.

(3c) Multiple functions of one element in the above embodiments may be implemented by multiple elements, or one function of one element may be implemented by multiple elements. Further, multiple functions of multiple elements may be implemented by one element, or one function implemented by multiple elements may be implemented by one element. Moreover, part of the configuration of the above-described embodiment may be omitted. Further, at least part of the configuration of the above-described embodiment may be added to or replaced with the configuration of another embodiment described above.

The present disclosure may be implemented, in addition to the relay device (i.e., the GW) described above, various forms such as a system including the relay device or the GW controller unit in the GW as a component, a program product for causing a computer to function as the GW controller unit, a non-transitory tangible storage medium including a semiconductor memory storing the program product, and a control method.

For reference to further explain features of the present disclosure, the description is added as follows.

The CSMA/CD CAN protocol is known as a communication protocol that is often used in vehicle communication systems. CAN is an abbreviation for Controller Area Network and is a registered trademark. Further, there is also known a communication system in which a plurality of communication paths (hereinafter, buses) are connected by a relay device (hereinafter, gateway device).

Furthermore, there is known recently, as a technology for reducing the power consumption of an in-vehicle network using CAN, a partial network technology in which a gateway device switches power on/off individually for each bus according to the vehicle conditions.

For example, the CAN protocol (for example, ISO11898-6) defines a selective wakeup function for selectively waking up the ECUs that require communication among all the ECUs connected to the bus. The ECU is an abbreviation for Electronic Control Unit.

Further, there is a communication system (that is, a network system) composed of an ECU having a selective wakeup function. In this communication system, it is common for ECUs to manage the timing of sleep and wakeup by exchanging management signals for managing sleep (that is, low power consumption state)/wakeup (that is, activated state) with each other. As is well known, this wakeup state indicates a normal operating state (that is, activated state) in which normal processing such as transmission/reception of control data or the like can be performed in a communication device. The sleep state indicates an operating state in which power consumption is lower than that in the wakeup state.

The management signal in the network system is referred to as a network management frame (that is, NM frame), and particularly the wakeup signal is referred to as a wakeup frame (that is, WU frame).

By the way, in a communication system in which buses are connected to a plurality of ports of input and output of a gateway device and a plurality of ECUs are connected to each bus, the following problems may occur.

For example, suppose only 20 or less ECUs (that is, 20 nodes or less) are connected to one bus. In this case, to that extent, the load applied to the bus by transmitting and receiving the wakeup frame (that is, the bus load) is not so problematic.

However, in recent vehicles, more than 100 ECUs are connected to a plurality of buses, and moreover, such a plurality of buses are connected via a gateway device. The large network system in which a plurality of buses to which many such ECUs are connected are connected via a gateway device signifies a network system that is large enough to require a gateway device. In such a large network system, when the above-mentioned selective wakeup function is introduced, the bus load may increase.

That is, in the large network system as described above, a large number of ECUs exceeding 100 are configured to share information on whether or not each other can wake up. Only for this reason, it is necessary to transmit and receive many wakeup frames, which increases the bus load.

Therefore, there is a possibility that transmission/reception of the original vehicle control signal (that is, the control frame) may be hindered. For example, the control frame may not be transmitted, or the transmission/reception of the control frame may be delayed.

It is thus desired to provide a technique capable of reducing a bus load in a communication system.

An aspect of the present disclosure described herein is set forth in the following clauses.

According to an aspect of the present disclosure, a relay device in a communication system is provided as follows.

According to an aspect of the present disclosure, a relay device is provided to be included in a communication system. The communication system further includes a plurality of buses and a plurality of communication devices. The plurality of buses is connected to and respectively corresponds to a plurality of ports in the relay device. The plurality of buses serve as communication paths for communicating a plurality of communication frames that include a plurality of wakeup frames respectively including a plurality of makeup patterns. One or more than one communication device of the plurality of communication devices is connected to each bus. Each communication device of the plurality of communication devices has an operating mode being switchable between a wakeup state and a sleep state. Each wakeup pattern of the plurality of wakeup patterns includes an operating mode information item indicating the operating mode.

The relay device includes an information aggregation unit and a frame preparation unit. Herein, in response to the plurality of wakeup frames being received via the plurality of ports from the plurality of buses, the information aggregation unit is configured to obtain the wakeup pattern as an aggregated wakeup pattern by aggregating the operating mode information items included in the plurality of wakeup patterns in the plurality of wakeup frames to include the operating mode information item required to be transmitted and received while reducing a counted number of the plurality of the wakeup patterns. The frame preparation unit is configured to prepare a wakeup frame for transmission that is to be transmitted via a respective port of the plurality of ports to a corresponding bus of the plurality of buses by using the aggregated wakeup pattern that is obtained by aggregating the operating mode information items in the plurality of wakeup frames.

With such a configuration according to the aspect in the present disclosure, the bus load in the communication system can be reduced.

That is, in the relay device, when a plurality of wakeup frames are received from each bus, the information indicating the operating mode included in the wakeup patterns in multiple wakeup frames is aggregated to include predetermined information to be transmitted/received (that is, information on the required operating mode for transmission/reception) and to reduce the number (i.e., a counted number) of wakeup patterns. Thereby, the aggregated makeup pattern (that is, the wakeup pattern after aggregation) is obtained. Then, a wakeup frame for transmission is prepared by using the aggregated wakeup pattern in which the information is aggregated in that way.

Therefore, the configuration according to the aspect of the present disclosure transmits a wakeup frame for transmission including a wakeup pattern in which information is aggregated in the above way, to each destination bus. This configuration can reduce the amount of communication as compared with the case where each wakeup frame is transmitted without aggregating the information, that is, as compared with the case where a plurality of wakeup frames are transmitted as they are to another bus. As a result, the communication load on the bus (that is, the bus load) can be suppressed.

What is claimed is:

1. A relay device included in a communication system that further includes
   (i) a plurality of buses connected to and respectively corresponding to a plurality of ports in the relay device, the plurality of buses serving as communication paths for communicating a plurality of communication frames that include a plurality of wakeup frames respectively including a plurality of wakeup patterns, and
   (ii) a plurality of communication devices, one or more than one communication device of the plurality of communication devices being connected to each bus, each communication device of the plurality of communication devices having an operating mode being switchable between a wakeup state and a sleep state, each wakeup pattern of the plurality of wakeup patterns including an operating mode information item indicating the operating mode, the relay device comprising:
   an information aggregation unit; and
   a frame preparation unit, wherein:
   in response to the plurality of wakeup frames being received via the plurality of ports from the plurality of buses, the information aggregation unit is configured to obtain a wakeup pattern as an aggregated wakeup pattern by aggregating the operating mode information items included in the plurality of wakeup patterns in the plurality of wakeup frames to include the operating mode information item required to be transmitted and received while reducing a counted number of the plurality of the wakeup patterns, and
   the frame preparation unit is configured to prepare a wakeup frame for transmission that is to be transmitted via a respective port of the plurality of ports to a corresponding bus of the plurality of buses by using the aggregated wakeup pattern that is obtained by aggregating the operating mode information items in the plurality of wakeup frames.

2. The relay device according to claim 1, wherein:
(i) a first port being any one of the plurality of ports is connected to a first bus of the plurality of buses corresponding to the first port; and
(ii) the first bus is connected to more than one communication device of the plurality of communication devices,
wherein the information aggregation unit is further configured to obtain the wakeup pattern as an aggregated wakeup pattern for port, which corresponds to the first port
by aggregating the operating mode information items included in the makeup frames received from the more than one communication device via the first bus and the first port.

3. The relay device according to claim 2, wherein a second port being any one of the plurality of ports is connected to a second bus of the plurality of buses corresponding to the second port,
wherein the information aggregation unit is further configured to obtain the wakeup pattern as an aggregated wakeup pattern for transmission, the aggregated wakeup pattern for transmission being to be included in the wakeup frame for transmission, which is to be transmitted via the second port and the second bus,
by aggregating the operating mode information items, which are included in the plurality of wakeup patterns,
excluding the operating mode information item included in the aggregated wakeup pattern for port, which corresponds to the second port.

4. The relay device according to claim 2, wherein the plurality of ports are (i) a second port being any one of the plurality of ports, the second port being connected to a second bus of the plurality of buses corresponding to the second port, and (ii) more than one different second port other than the second port,
wherein the information aggregation unit is further configured to obtain the makeup pattern as an aggregated wakeup pattern for transmission, the aggregated wakeup pattern for transmission being to be included in the wakeup frame for transmission, which is to be transmitted via the second port and the second bus,
by aggregating the operating mode information items included in the aggregated wakeup patterns for port, which correspond to the more than one different second port.

5. The relay device according to claim 1, wherein:
in aggregating the operating mode information items included in the plurality of wakeup frames,
the information aggregation unit is further configured to take inclusive OR of the operating mode information items.

6. The relay device according to claim 1, wherein:
(i) the plurality of ports include (a) a third port being any one of the plurality of ports, and (b) two or more than two different third ports of the plurality of ports other than the third port, and (ii) the third port is connected to a third bus of the plurality of buses corresponding to the third port, and the third bus is a backbone line,
wherein:
the information aggregation unit is further configured to obtain the wakeup pattern as two or more than two wakeup patterns respectively corresponding to the two or more than two different third ports, wherein a respective wakeup pattern of the two or more than two wakeup patterns is obtained by aggregating the operating mode information item or the operating mode information items received by a corresponding port of the two or more than two different third ports, and
the frame preparation unit is further configured to prepare the wakeup frame for transmission to be transmitted via the third port to the third bus being the backbone line such that the wakeup frame for transmission is configured to include the two or more than two wakeup patterns respectively corresponding to the two or more than two different third ports.

7. The relay device according to claim 1, wherein:
in response to one communication device of the plurality of communication devices receiving the wakeup frame for transmission,
the one communication device is configured to determine its own operating mode being the wakeup state or the sleep state based on the operating mode information item included in the received wakeup frame for transmission.

8. The relay device according to claim 1, wherein:
the wakeup frame is configured to store the operating mode information item in each of groups into which the plurality of communication devices classified individually.

9. A relay device comprising:
at least one storage;
at least one controller communicably coupled to the storage; and
a plurality of ports communicably coupled to the controller and the storage, the plurality of ports being connected to and respectively corresponding to a plurality of buses serving as communication paths for communicating a plurality of communication frames that include a plurality of wakeup frames respectively including a plurality of wakeup patterns, wherein:
each bus of the plurality of buses is connected to one communication device or more than one communication device of a plurality of communication devices;
each communication device of the plurality of communication devices is assigned with an operating mode being switchable between a wakeup state and a sleep state; and
each wakeup pattern of the plurality of wakeup patterns including an operating mode information item indicating the operating mode,
wherein:
in response to the plurality of wakeup frames being received via the plurality of ports from the plurality of buses, the controller is configured to
obtain a wakeup pattern as an aggregated wakeup pattern by aggregating the operating mode information items included in the plurality of wakeup patterns in the plurality of wakeup frames to reduce a counted number of the plurality of the wakeup patterns, and
prepare a wakeup frame for transmission that is to be transmitted via a respective port of the plurality of ports to a corresponding bus of the plurality of buses by using the aggregated wakeup pattern that is obtained by aggregating the operating mode information items in the plurality of wakeup frames.

10. The relay device according to claim 9,
wherein a first port being any one of the plurality of ports is connected to a first bus of the plurality of buses corresponding to the first port,
wherein the controller is further configured to
obtain the wakeup pattern as an aggregated wakeup pattern for port correspond to the first port
either
(i) by using, in response to the first bus being connected to only one communication device of the plurality of communication devices, the operating mode information item received from the only one communication device via the first bus and the first port; or
(ii) by aggregating, in response to the first bus being connected to more than one communication device of the plurality of communication devices, the operating mode information items received from the more than one communication device via the first bus and the first port.

11. The relay device according to claim 10,
wherein the plurality of ports are (i) a second port being any one of the plurality of ports, the second port being connected to a second bus of the plurality of buses corresponding to the second port, and (ii) one or more than one different port other than the second port,
wherein the controller is further configured to
obtain the wakeup pattern as an aggregated wakeup pattern for transmission corresponding to the second port,
either
(i) by using, in response to the one or more than one different port being one different port, the operating mode information item included in the aggregated wakeup pattern for port corresponding to the one different port, or
(ii) by aggregating, in response to the one or more than one different port being more than one different port, the operating mode information items included in the aggregated wakeup patterns for port corresponding to the more than one different port, and
prepare the wakeup frame for transmission to be transmitted via the second port to the second bus by using the aggregated wakeup pattern for transmission corresponding to the second port.

* * * * *